United States Patent
Tang et al.

(10) Patent No.: US 10,389,216 B2
(45) Date of Patent: Aug. 20, 2019

(54) STATOR APPLICABLE TO A SINGLE-PHASE OR POLYPHASE MOTOR, MOTOR COMPRISING THE STATOR AND COMPRESSOR COMPRISING THE MOTOR OR THE STATOR

(71) Applicant: Danfoss (Tianjin) Ltd., Tianjin (CN)

(72) Inventors: Weiping Tang, Tianjin (CN); Li Yao, Tianjin (CN); Wanzhen Liu, Tianjin (CN); Guangqiang Liu, Tianjin (CN); Yan Lin, Tianjin (CN); Zhenyu Wang, Tianjin (CN); Meng Wang, Tianjin (CN)

(73) Assignee: Danfoss (Tianjin) Ltd., Tianjin (CN)

( * ) Notice: Subject to any disclaimer, the term of this patent is extended or adjusted under 35 U.S.C. 154(b) by 362 days.

(21) Appl. No.: 15/392,350

(22) Filed: Dec. 28, 2016

(65) Prior Publication Data
US 2017/0194845 A1    Jul. 6, 2017

(30) Foreign Application Priority Data

Dec. 31, 2015  (CN) .......................... 2015 1 1034764

(51) Int. Cl.
*H02K 17/12* (2006.01)
*F04C 18/02* (2006.01)
(Continued)

(52) U.S. Cl.
CPC ......... *H02K 17/12* (2013.01); *F04C 18/0215* (2013.01); *F04C 29/0085* (2013.01);
(Continued)

(58) Field of Classification Search
CPC .......... H02K 17/12; H02K 1/12; H02K 1/146; H02K 3/18; H02K 5/12; H02K 17/04;
(Continued)

(56) References Cited

U.S. PATENT DOCUMENTS 3,686,043 A * 8/1972 Broyles .................... C21D 1/70
                                                148/112
3,942,055 A * 3/1976 Hoffmeyer ............. H02K 1/165
                                                310/216.111
(Continued)

FOREIGN PATENT DOCUMENTS

CN    101807838 A    8/2010
CN    201639375 U   11/2010
(Continued)

*Primary Examiner* — Emily P Pham
(74) *Attorney, Agent, or Firm* — McCormick, Paulding & Huber LLP (57) ABSTRACT

A stator, a motor and a compressor are provided. The stator includes a stator iron core and a winding. The stator iron core includes: an annular yoke; multiple stator teeth, near ends of the stator teeth being fixedly adjacent to an inner surface of the yoke and projecting inward towards the center of the stator iron core along a radial direction of the yoke, remote ends of the stator teeth that face inward along the radial direction defining a center hole for accommodating a rotor, and the stator teeth being spaced from each other in a circumferential direction; and multiple stator slots, each stator slot being defined between two neighboring stator teeth. The winding is wound around the stator teeth and operable for generating a rotating magnetic field. The yoke has at least two cut edges at an outer periphery thereof, disposed asymmetrically relative to the center.

20 Claims, 4 Drawing Sheets

(51) Int. Cl.
  *F04C 29/00* (2006.01)
  *H02K 1/14* (2006.01)
  *H02K 3/18* (2006.01)
  *H02K 17/04* (2006.01)
  *H02K 1/12* (2006.01)
  *H02K 5/12* (2006.01)
  *H02K 1/16* (2006.01)
  *H02K 1/20* (2006.01)
  *H02K 7/14* (2006.01)
  *H02K 9/19* (2006.01)

(52) U.S. Cl.
  CPC .............. *H02K 1/12* (2013.01); *H02K 1/146* (2013.01); *H02K 3/18* (2013.01); *H02K 5/12* (2013.01); *H02K 17/04* (2013.01); *F04C 2240/40* (2013.01); *H02K 1/16* (2013.01); *H02K 1/165* (2013.01); *H02K 1/20* (2013.01); *H02K 7/14* (2013.01); *H02K 9/19* (2013.01)

(58) Field of Classification Search
  CPC ............ H02K 1/16; H02K 1/165; H02K 1/20; H02K 7/14; H02K 9/19; F04C 18/0215; F04C 29/0085; F04C 2240/40
  See application file for complete search history.

(56) References Cited

U.S. PATENT DOCUMENTS

| | | | |
|---|---|---|---|
| 6,836,045 B2 | 12/2004 | Murakami et al. | |
| 7,843,101 B2* | 11/2010 | Ito | H02K 1/2766 310/156.46 |
| 7,868,509 B2* | 1/2011 | Yoshino | F04B 35/04 310/216.055 |
| 2006/0273670 A1* | 12/2006 | Tung | H02K 1/02 310/67 R |
| 2007/0108934 A1* | 5/2007 | Smith | F25B 31/006 318/701 |
| 2007/0151241 A1* | 7/2007 | Arnold | B60K 6/26 60/605.1 |
| 2010/0247347 A1* | 9/2010 | Yoshino | H02K 17/185 417/410.1 |
| 2010/0329906 A1* | 12/2010 | Jung | H02K 1/165 417/410.1 |
| 2011/0050024 A1* | 3/2011 | Rose | F04C 18/0215 310/195 |
| 2011/0081263 A1* | 4/2011 | Yoshino | F04C 23/008 417/410.1 |
| 2015/0188480 A1* | 7/2015 | Liu | F04D 25/06 318/430 |

FOREIGN PATENT DOCUMENTS

| | | | |
|---|---|---|---|
| CN | 201674284 U | 12/2010 | |
| CN | 201975874 U | 9/2011 | |
| CN | 202405889 U | 8/2012 | |
| CN | 202957674 U * | 5/2013 | ............... H02K 1/14 |
| CN | 103138517 A | 6/2013 | |
| CN | 204243921 U | 4/2015 | |
| CN | 104948462 A | 9/2015 | |
| CN | 105048661 A | 11/2015 | |
| DE | 3713980 A1 | 11/1988 | |
| JP | S61280727 A | 12/1986 | |
| JP | 2003-32985 A | 1/2003 | |
| JP | 2009-195031 A | 8/2009 | |
| JP | 5042178 B2 | 10/2012 | |
| JP | 5560007 B2 | 7/2014 | |

* cited by examiner

STATOR APPLICABLE TO A SINGLE-PHASE OR POLYPHASE MOTOR, MOTOR COMPRISING THE STATOR AND COMPRESSOR COMPRISING THE MOTOR OR THE STATOR

CROSS REFERENCE TO RELATED APPLICATION

Applicant hereby claims foreign priority benefits under U.S.C. § 119 from Chinese Patent Application No. 201511034764.3 filed on Dec. 31, 2015, the content of which is incorporated by reference herein.

TECHNICAL FIELD

The present invention relates to the technical field of air conditioning or refrigeration technologies, and particularly, to a stator, a motor and a compressor.

BACKGROUND

A motor generally includes a stator and a rotor. The rotor is mounted inside the stator, supported by the housing, and rotatable relative to the stator. The stator and/or the rotor of the motor has a winding including coils. In the motor, electric power passes through the coils to generate a magnetic field, thereby rotating the rotor. The motor, particularly a three-phase induction motor, can be applied to drive a compressor (for example, a scroll compressor) in the air conditioning or refrigeration industry. However, the size and performance of the compressor including the motor (particularly, the efficiency and the cooling performance of the motor) have generally great impact on the size, working efficiency and stability of air conditioning apparatus including the compressor. In addition, machinability and costs of components in the motor are also important factors in the motor design.

Generally, the efficiency of the motor may be improved by replacing an induction motor with a permanent magnet motor or by optimizing the motor design by using an optimization algorithm. However, it becomes difficult for such methods to further improve the efficiency of the motor after the efficiency of the motor is improved to a certain degree.

To ensure stability of the motor, those skilled in the art may normally try to improve the cooling performance of the motor. In particular, when the size of the air conditioning apparatus is limited, especially when the size of the compressor and the size of the motor therein are limited, the cooling performance of the motor may be improved by optimization of structures of the components in the motor, in order to obtain a better efficiency in taking heat away from the motor and to enable a lower temperature for the motor.

To improve the cooling performance of the motor, various solutions have been proposed by those skilled in the art. For example, an additional part such as a cooling medium baffle may be provided in the motor to facilitate cooling or heat dissipation.

However, the existing solutions for cooling improvement cannot improve, without changing the size, performance or machinability of the motor, the cooling performance to enable the motor to continuously operate in a stable status and under a high-efficiency operating condition.

SUMMARY

As a compressor needs to continuously operate for a long time, and thus requires a stable high-efficiency operating condition and a cooling and heat dissipation condition so as to avoid accumulation of heat in the compressor and avoid affecting the stable operation. This is important especially for a motor in the compressor. Therefore, there is a continuous need for an improved design of a cooling structure in the motor. In addition, there is also a continuous need for maintaining a motor design with minimum performance loss.

In view of the above, an objective of the present invention provides a stator for a motor, particularly for a three-phase induction motor. The stator can improve the cooling performance of the motor and thus improve stable operation capability of an oil return system of a compressor, without significantly affecting performance, particularly, efficiency of the motor.

Another objective of the present invention provides a motor, particularly a three-phase induction motor, using the above-mentioned stator.

Yet another objective of the present invention provides a compressor using the above-mentioned stator or motor.

To achieve the above-mentioned objectives, according to a first aspect of the present invention, a stator applicable to a single-phase or polyphase motor is provided. The stator includes a stator iron core and a winding. The stator iron core includes: an annular yoke; multiple stator teeth, near ends of the stator teeth being fixedly adjacent to an inner surface of the yoke and projecting inward towards a center of the stator iron core along a radial direction of the yoke, remote ends of the stator teeth that face inward along the radial direction defining a center hole for accommodating a rotor, and the multiple stator teeth being spaced from each other in a circumferential direction; and multiple stator slots, each stator slot being defined between two neighboring stator teeth. The winding is wound on the stator teeth and operable for generating a rotating magnetic field. The yoke of the stator iron core has at least two cut edges at an outer periphery of the stator iron core. the number of the at least two cut edges is an even number; among the even number, every two opposite cut edges are arranged as a pair in parallel on two sides of the center of the stator iron core, and the center of the stator iron core is located in the middle of a connecting line between respective center points of the two opposite cut edges in each pair. In addition, on a connecting line between respective center points of at least one pair of cut edges, respective distances from the center of the stator iron core to the respective center points of the cut edges in said at least one pair are different.

In an implementation example, on the connecting line between the respective center points of the two opposite cut edges in said each pair, respective distances from the center of the stator iron core to the respective center points of the two cut edges in said each pair are different.

In an implementation example, arc segments between neighboring cut edges are located on a same circle on the outer periphery of the yoke, and a center of the circle coincides with the center of the stator iron core.

In an implementation example, the arc segments between the neighboring cut edges are not evenly distributed in the circumferential direction.

In an implementation example, the stator iron core is made of a laminated and stamped silicon steel sheet material.

In an implementation example, the stator iron core is an integral unit manufactured by a process of directly stamping a silicon steel sheet on which cut edges, stator teeth, and stator slots have been machined; or by a process of stamping a silicon steel sheet and performing edge-cutting on an outer periphery of the stamped silicon steel sheet.

According to another aspect of the present invention, a motor is provided. The motor includes a rotor and the above-mentioned stator. The rotor is rotatably disposed in the stator and is spaced apart from the stator by a distance.

In an implementation example, the motor is a fixed-frequency motor or a variable-frequency motor.

In an implementation example, the motor is a three-phase induction motor.

In an implementation example, an operating voltage of the motor is 200V to 575V or an operating voltage of a driver for the motor is 200V to 575V.

According to yet another aspect, a compressor is provided. The compressor includes the above-mentioned stator or the above-mentioned motor.

In an implementation example, the compressor is a scroll compressor.

In an implementation example, a suction port for gas suction in the compressor is configured to be close to a cut edge whose center point is closer to a center of a stator iron core than other cut edge belonging to a same pair.

According to yet another aspect, stator for a single-phase or polyphase motor is provided. The stator includes a stator iron core and a winding. The stator iron core includes: an annular yoke, multiple stator teeth, near ends of the stator teeth being fixedly adjacent to an inner surface of the yoke and projecting inward towards a center of the stator iron core along a radial direction of the yoke, remote ends of the stator teeth that face inward along the radial direction defining a center hole for accommodating a rotor, and the multiple stator teeth being spaced from each other in a circumferential direction, and multiple stator slots, each stator slot being defined between two neighboring stator teeth. The winding is wound on the stator teeth and operable for generating a rotating magnetic field. The yoke of the stator iron core has at least two cut edges at an outer periphery of the stator iron core, and distances from center points of neighboring cut edges to a center of the stator iron core are not all the same. Besides, there are an even number of cut edges in which every two opposite cut edges forming a pair are arranged on two sides of the center of the stator iron core. In addition, two opposite cut edges in at least one pair of cut edges are arranged to form an angle between the two opposite cut edges.

According to yet another aspect, a stator for a single-phase or polyphase motor is provided. The stator includes a stator iron core and a winding. The stator iron core includes: an annular yoke; multiple stator teeth, near ends of the stator teeth being fixedly adjacent to an inner surface of the yoke and projecting inward towards a center of the stator iron core along a radial direction of the yoke, remote ends of the stator teeth that face inward along the radial direction defining a center hole for accommodating a rotor, and the multiple stator teeth being spaced from each other in a circumferential direction; and multiple stator slots, each stator slot being defined between two neighboring stator teeth. The winding is wound on the stator teeth and operable for generating a rotating magnetic field. Besides, the yoke of the stator iron core has at least two cut edges at an outer periphery of the stator iron core, and distances from center points of neighboring cut edges to a center of the stator iron core are not all the same. In addition, there are an odd number of cut edges, and included angles between neighboring cut edges among the odd number of cut edges are not the same in the circumferential direction.

According to above aspects and implementation examples, by asymmetrically-arranged cut edges, a cut-off area of the cut edges can be changed by adjusting the size and shape of the cut edges, so as to optimize a gas path and an oil path inside a shell of a compressor, thereby enhancing cooling performance of a motor and reducing oil circulation rate (OCR). In addition, the use of asymmetrically-arranged cut edges with a limited size can save materials and ensure a utilization rate of a stator iron core.

Furthermore, as the cut edges are disposed on the stator iron core of the motor, particularly on the outer surface of the yoke, a smoother oil path can be achieved, thereby improving energy efficiency of the compressor.

Finally, although the cut edges of the stator iron core have a limited cut length from the circumference of the stator iron core, the asymmetrical arrangement is enough to ensure the cooling and heat dissipation effect. In this way, the cut edges with a limited size can ensure the firmness of the stator mounted into the shell of the motor and also can increase the cross-sectional area for bearing the deformation on the stator, thereby greatly reducing a possibility of severe deformation of the stator.

Individual technical features and combinations of the features may be described in the specification below. It should be noted that the general description above and the detailed description below are merely exemplary, and are not intended to limit the broad inventive concept on which the embodiments disclosed herein are based.

BRIEF DESCRIPTION OF THE DRAWINGS

Embodiments of the present invention will be described below by examples with reference to accompanying drawings. A same reference sign denotes a same part. A brief description of the accompanying drawings is as follows.

DETAILED DESCRIPTION

To make the above-mentioned objectives, features, and advantages of the present disclosure more comprehensible, technical solutions in exemplary embodiments of the present disclosure will be described in detail below with reference to the accompanying drawings. In this specification, same or similar reference sings denote same or similar parts. The following description of the embodiments with reference to the accompanying drawings is used for explaining the overall inventive concept of the present invention, and shall not be construed as a limitation to the present invention.

Generally, a compressor is used in an air conditioning or refrigeration industry. The compressor can convert mechanical energy into a potential energy for compressing a fluid, and may be classified into a reciprocating compressor, a scroll compressor, a centrifugal compressor, and a vane compressor.

The following describes, by taking the scroll compressor as an example, the application and structure of a motor in the scroll compressor. Although this embodiment is described by taking the scroll compressor as an example, it can be other types of compressors.

Typically, in the scroll compressor, an orbiting scroll orbits around the center of a base circle of a fixed scroll, and the volume of a compression chamber formed by cooperation of the orbiting scroll and the fixed scroll is gradually reduced, so as to compress gas. The orbiting scroll is directly supported on a housing fixed inside a compressor shell. In addition, one end (upper end) of a crankshaft for driving the orbiting scroll to orbit is connected to the orbiting scroll through a center hole of the housing, and the other end (lower end) of the crankshaft is directly supported on a lower bearing support fixed inside the shell of the scroll compressor. Thereby, suction, compression and discharge operations can be achieved when the crankshaft rotates clockwise or anti-clockwise. The compressed gas is discharged through a discharge valve to a high-pressure chamber of the scroll compressor, and is finally discharged to the outside of the scroll compressor through a discharge port.

Figure 1:
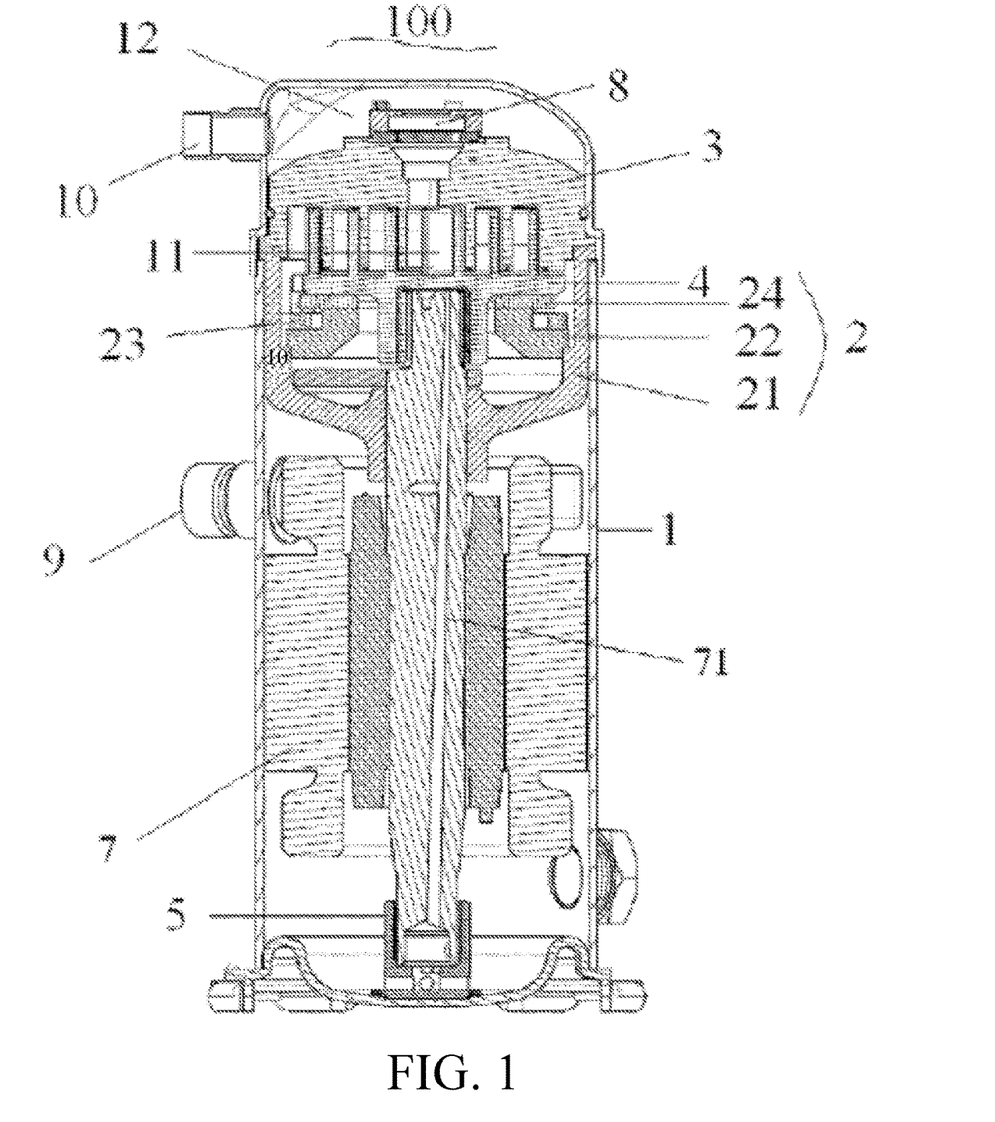
FIG. 1 is a schematic diagram of a compressor including a three-phase induction motor according to a first embodiment of the present invention.
Figure 2A:
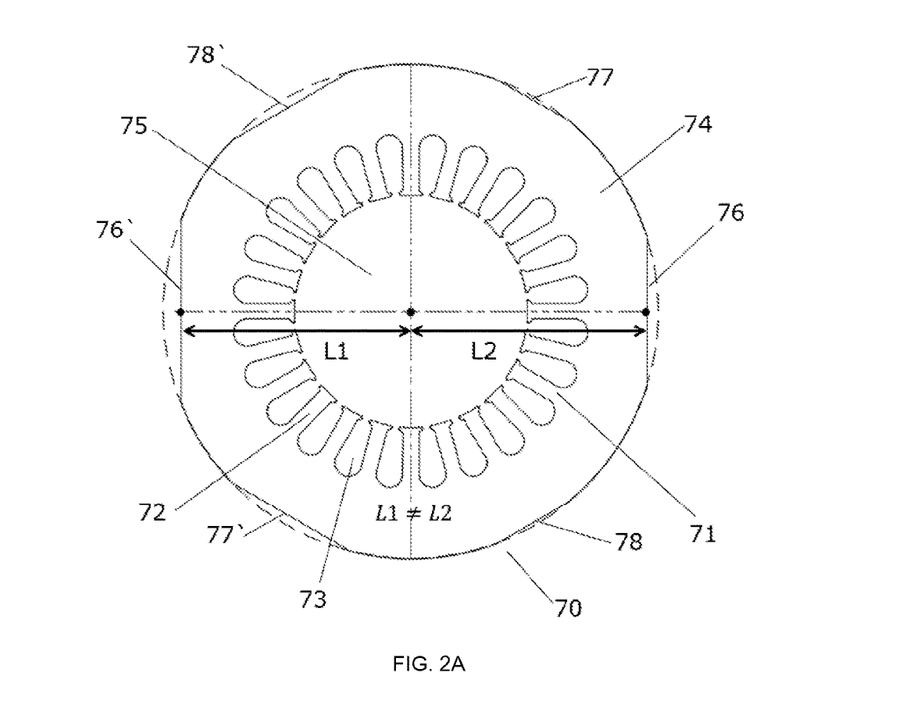
FIG. 2A is a schematic cross-sectional view of a stator in the three-phase induction motor in FIG. 1, where a rotor is not shown.
Figure 2B:
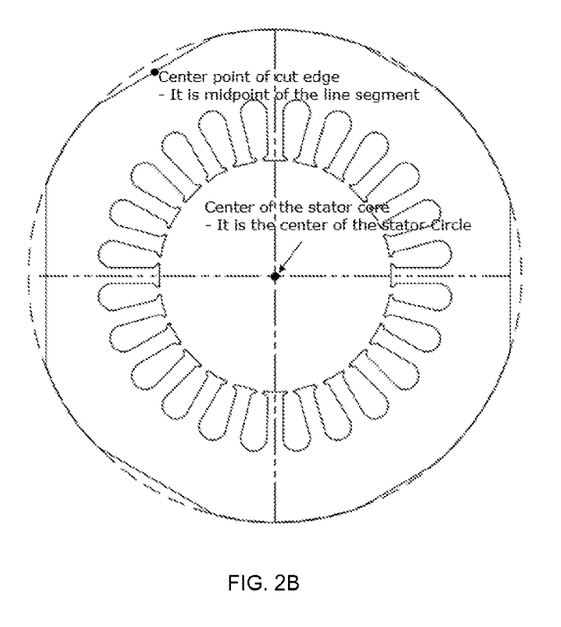
FIG. 2B is a schematic cross-sectional view of a stator in the three-phase induction motor in FIG. 1, where a rotor is not shown.
Figure 2C:
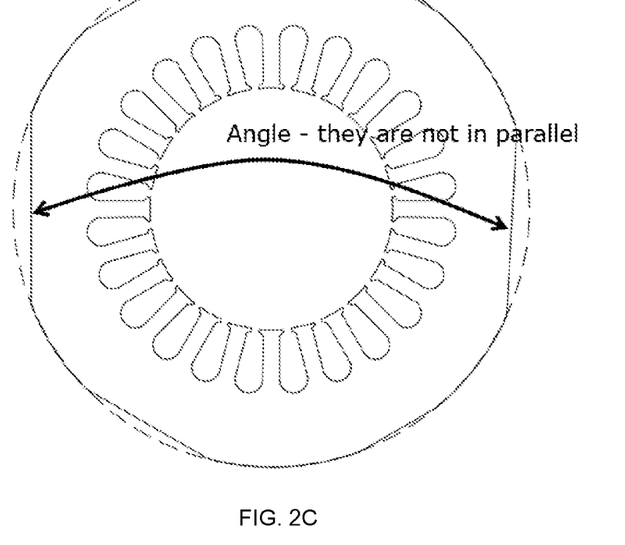
FIG. 2C is a schematic cross-sectional view of a stator in the three-phase induction motor in FIG. 1, where a rotor is not shown.
Figure 2D:
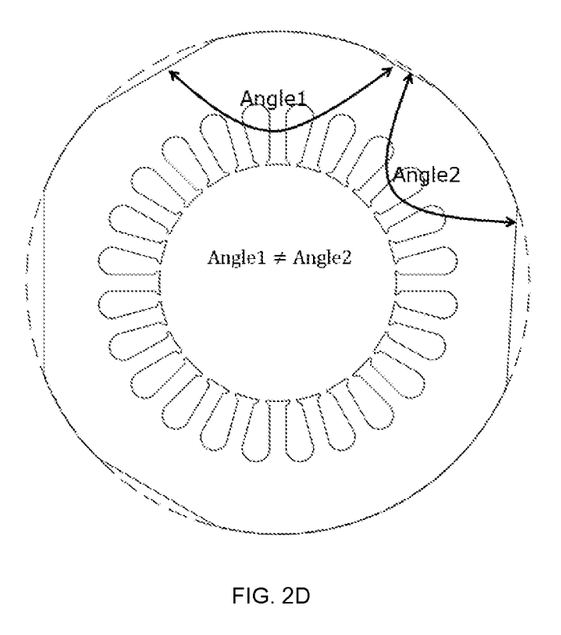
FIG. 2D is a schematic cross-sectional view of a stator in the three-phase induction motor in FIG. 1, where a rotor is not shown.

FIG. 1 shows a scroll compressor 100 of the present invention. The scroll compressor 100 includes: a scroll compressor shell 1; a housing 2, fixed inside the scroll compressor shell 1; a fixed scroll 3, fixed inside the shell 1; an orbiting scroll 4, orbitably supported on the housing 2 and cooperating with the fixed scroll 3 to form a compression chamber 11; a lower support 5, fixed to a lower end of the shell 1; an actuating mechanism 7 such as a motor, fixed to a lower end of the scroll compressor 100, and configured to transfer a rotating force though a crankshaft structure 6, the crankshaft structure 6 having an upper end connected to the orbiting scroll 4 to drive the orbiting scroll 4 to orbit and a lower end supported on the lower support 5; and a discharge valve 8, configured to discharge a gas from the compression chamber 11 and prevent the gas from flowing back to the scroll compressor 100.

The orbiting scroll 4 is supported on an upper surface or a bearing surface of the housing 2. The shell 1 defines an enclosed space in the scroll compressor, accommodating components such as the fixed scroll 3, the orbiting scroll 4 and the housing 2. The volute of the fixed scroll 3 and the volute of the orbiting scroll 4 are engaged or jointed with each other to form the compression chamber 11. The fixed scroll 3 is disposed above the orbiting scroll 4. The motor 7 includes a stator and a rotor. The motor drives the orbiting scroll 4 through the crankshaft structure 6.

The scroll compressor 100 takes in the gas through a suction port 9. After the actuating mechanism 7 (for example, the motor) is started, the orbiting scroll 4 is driven by the crankshaft structure 7 and restricted by an anti-rotation mechanism Oldham coupling 6, orbiting with a small radius around the center of a base circle of the fixed scroll 3, so as to generate a high-pressure high-temperature gas in the compression chamber 11 formed by the orbiting scroll 4 and the fixed scroll 3. The high-pressure high-temperature gas is discharged into the high-pressure chamber 12 through the discharge valve 8 along with the movement of the orbiting scroll 4. The discharge valve 8 is used to prevent backflow of the gas in the high-pressure chamber 12. Finally, the gas in the high-pressure chamber 12 is discharged to the outside of the scroll compressor through a discharge port 10. The above-mentioned process is repeated, which can continuously generate the high-temperature high-pressure gas in the scroll compressor 100.

In the present invention, the housing 2 includes a housing body 21 and a housing support plate 22. Moreover, the housing body 21 may be fixed inside the shell 1 by interference fit, and may be overlapped onto an end face of the shell 1 of the scroll compressor 100. The housing support plate 22 may be fixed to the housing body 21 by means of clearance fit. In addition, a sliding slot of the housing support plate 22 is overlapped and connected onto the housing body 21, thereby fixing the housing support plate 22 and preventing the housing support plate 22 from rotation. The Oldham coupling 23 has a pair of upper projecting portions and a pair of lower projecting portion. The projecting portions in each pair are opposite to each other and the two pairs are distributed in a cross pattern. The lower projecting portions are inserted into the sliding slot on the housing support plate 22, and the upper projecting portion is inserted into an ear-shaped groove of the orbiting scroll 4. While the scroll compressor 100 is working, the orbiting scroll 4 can orbit with a small radius relative to the housing support plate 22.

If it is required (for example, when the bearing area of the housing support plate 22 for supporting the orbiting scroll 4 is not enough), a thrust bearing disk 24 may further be arranged between the orbiting scroll 4 and the Oldham coupling 23, in order to increase the bearing area for the orbiting scroll 4. The thrust bearing disk 24 is fixed and overlapped onto the housing support plate 22 by means of interference fit, and is adapted to support the orbiting scroll 4.

As shown in FIG. 1, the motor for a compressor is generally a three-phase induction motor. It should be noted that the motor is not limited to the three-phase induction motor. The three-phase induction motor illustrated herein is an example, and the inventive concept of the present invention can be applied to other types of motors. In addition, the three-phase induction motor of the present invention is not limited to the application in the scroll compressor described in FIG. 1, but may also be applied to other types of compressors.

As known to those skilled in the art, a three-phase motor or a three-phase induction motor generally includes a stator, a rotor, and other related parts (such as a shell). In the embodiments of the present invention, a stator of an existing three-phase induction motor is improved. When a three-phase induction motor is designed and manufactured, the improved stator can be used to replace an existing stator in the three-phase induction motor.

Generally, the rotor is rotatably disposed inside the stator and spaced apart from the stator by a distance. An operating voltage of the motor or the motor's driver may range from 200 V to 575 V. It should be noted that the motor is not limited to a specific type of motor, and may be, for example, a single-phase motor or a polyphase motor such as a three-phase motor.

A three-phase induction motor for a scroll compressor, particularly, the structure of a stator in the motor, will be described hereinafter according to embodiments of the present invention with reference to the accompanying drawings.

FIG. 2A-FIG. 2D are schematic cross-sectional views of a stator in a three-phase induction motor according to an embodiment of the present invention. The three-phase induction motor includes a stator and a rotor. As shown in FIG. 2A-FIG. 2D, the stator 70 includes a stator iron core 71 and a winding. The stator iron core 71 is in an approximately-cylindrical shape or other feasible shape. The stator iron core has a hollow circular center hole 75, operable for accommodating the rotor therein. The stator iron core 71 includes: an annular yoke 74; multiple stator teeth 72 extending inward along a radial direction of the stator and evenly spaced apart from each other in a circumferential direction of the stator; and stator slots 73 distributed between the multiple stator teeth 72. The winding is wound on the stator teeth 72 and spatially spaced in sequence by an electrical angle such as 120°, and is operable for generating a rotating magnetic field. The winding may be, for example, a three-phase winding. As can be seen from FIG. 2, the stator slots 73 are evenly distributed along the circumferential direction of the stator.

Specifically, the multiple stator teeth 72 are arranged on an inner surface of the yoke 74. The stator teeth project, starting from their respective near ends adjacent to the yoke 74, inward towards the center of the stator iron core 71 along a radial direction of the yoke, and terminate at the center hole 75 with their respective remote ends. Therefore, the center hole 75 is substantially defined by the remote ends of the stator teeth 72.

The remote ends of the stator teeth 72 may extend in a swallowtail pattern as shown in FIG. 2A-FIG. 2D, operable for defining the center hole 75 that is able to accommodate the rotor more effectively.

The stator slots 73 may have a water drop shape that has a gradually increasing width as it extends outward along the radial direction, which makes it more convenient to arrange the winding in the stator slots. In addition, such water drop shape shown in FIG. 2A-FIG. 2D can be manufactured more easily.

Each of the stator slots 73 may be defined between two neighboring stator teeth. Therefore, the number of stator slots 73 is equal to the number of stator teeth 72. In this embodiment, both the number of stator teeth 72 and the number of stator slots 73 may be 24.

Specifically, the yoke 74 of the stator iron core 71 has at least two cut edges on its outer periphery. Preferably, as shown in FIG. 2A-FIG. 2D, for example, the yoke 74 has six cut edges on the outer periphery. The cut edges are grouped in pairs. The two cut edges in each pair are disposed in parallel at opposite positions on the outer periphery of the yoke 74, and are respectively located on two sides of the center of the stator iron core 71 along the diameter direction of the yoke 74. More preferably, the cut edges are asymmetrically arranged relative to the center of the stator iron core.

As shown in FIG. 2A-FIG. 2D, three pairs of cut edges, namely, 76 and 76', 77 and 77', 78 and 78', and six arc segments between the cut edges form a continuous outer periphery of the yoke 74. In other words, each of the cut edges is substantially a chord cut edge between two arc segments. The six arc segments arranged at intervals between the cut edges are arcs of a same circle, and the center of the circle coincides with the center of the stator iron core 71. Specifically, as shown in FIG. 2A-FIG. 2D, the cut edge 76 and the cut edge 76' are disposed opposite to and in parallel with each other, and form a first pair of cut edges; the cut edge 77 and the cut edge 77' are disposed opposite to and in parallel with each other, and form a second pair of cut edges; the cut edge 78 and the cut edge 78' are disposed opposite to and in parallel with each other, and form a third pair of cut edges.

In this embodiment, in any pair of cut edges shown in FIG. 2A-FIG. 2D, respective straight-line distances from respective center points of the two cut edges to the center point of the yoke 74 are different. Specifically, as shown in FIG. 2A-FIG. 2D, in the cut edges 76, 76', 77, 77', 78, and 78' that are parallel to each other in pairs and respectively located on the two sides of the center of the stator iron core, an imaginary connecting line between the respective center points of the two cut edges in each pair is located on the diameter of the circle which the arc segments of the yoke belong to, and respective distances from the respective center points of the two cut edges in each pair to the center of circle are different.

In this embodiment, in any pair of cut edges shown in FIG. 2, respective straight-line distances from respective center points of the two cut edges to the center point of the yoke 74 are different. Specifically, as shown in FIG. 2, in the cut edges 76, 76', 77, 77', 78, and 78' that are parallel to each other in pairs and respectively located on the two sides of the center of the stator iron core, an imaginary connecting line between the respective center points of the two cut edges in each pair is located on the diameter of the circle which the arc segments of the yoke belong to, and respective distances from the respective center points of the two cut edges in each pair to the center of circle are different.

Therefore, the arc segments between the cut edges are not evenly distributed along the circumferential direction, and the arc segments may not necessarily have the same length.

Specifically, as shown in FIG. 2A-FIG. 2D, the pairs of cut edges 76, 76', 77, 77', 78, and 78' are in the circumferential direction of the yoke, and are not evenly distributed. In the above-mentioned three pairs of cut edges, each pair of cut edges has a connecting line between respective center points of the two cut edges, the three respective connecting lines of the three pairs converge at the center of the stator core iron, while dividing the entire circumferential direction into segments with different central included angles.

In addition, in the above-mentioned embodiment, the stator iron core is, for example, preferably made of a silicon steel sheet material by lamination and stamping when considering factors including mechanical properties of materials, machinability and cost performance.

In an embodiment, the stator iron core is an integral unit, and is preferably formed by a process of stamping silicon steel sheets on which cut edges, stator teeth, and stator slots have been formed: or, by a process of stamping silicon steel sheets and then performing edge-cutting on an outer periphery of the stamped silicon steel sheets. As can be seen, the stator iron core has a simple structure that can be manufactured easily.

In addition, in a compressor using a motor that has the above-mentioned stator iron core with asymmetrical cut edges, a suction port for gas suction in the compressor is configured closer to a longer cut edge in a pair of cut edges in order to improve gas suction. Specifically, in an embodiment shown in FIG. 2A-FIG. 2D, the suction port 9 in the compressor shown in FIG. 1 is located closer to the cut edges 76', 77', and 78' each of which corresponds to a larger cross-sectional area cut from the stator than its opposite cut edge, that is, has a larger length than its opposite cut edge has. In other words, the suction port is adjacent to a cut edge whose center point is closer to the center of the stator iron core than the other cut edge in the same pair.

The above-mentioned detailed description mainly describes the stator of the three-phase induction motor. It should be understood that the motor may further include a shell (now shown) for containing the stator and the rotor, a base, and other common components. To avoid obscuring the main inventive aspect of the present invention, the shell or structures for connecting the shell and the stator or the like will not be described in detail herein.

The temperature control effect of the stator with asymmetrical cut edges of the present invention is further described below through specific embodiments and with reference to, for example, FIG. 3 and FIG. 4.

Preferably, a conventional motor design without a cut edge is compared with a motor design with a stator iron core having multiple asymmetrical cut edges.

Specifically, it is shown by tests that reduction in the efficiency is quite limited under a same motor torque. Therefore, the cooling and heat dissipation performance can be improved by using the motor including the stator iron core with asymmetrical cut edges, while operating efficiency of the motor can be maintained without a big decrease.

Figure 3:
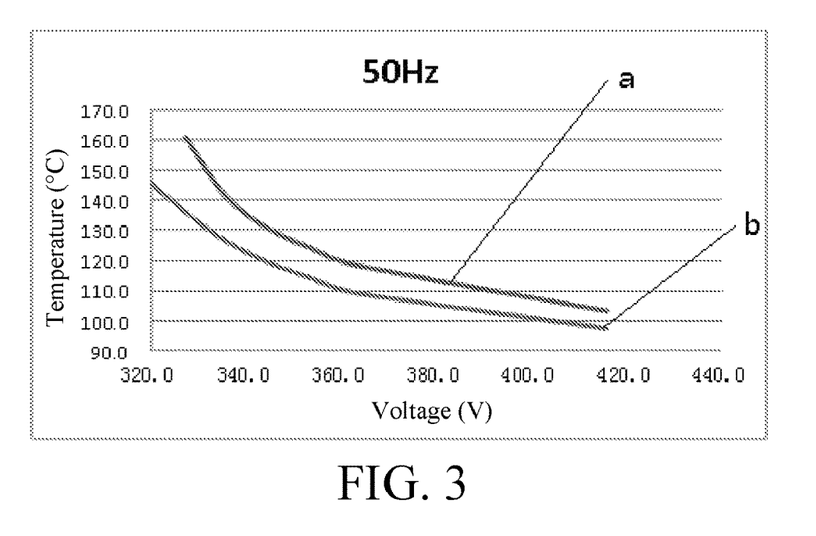
FIG. 3 is a graph showing a voltage-temperature relation in a compressor with a conventional motor under an operation condition of 50 Hz, and a voltage-temperature relation in a compressor with a motor including the stator iron core of FIG. 2 under an operation condition of 50 Hz.
Figure 4:
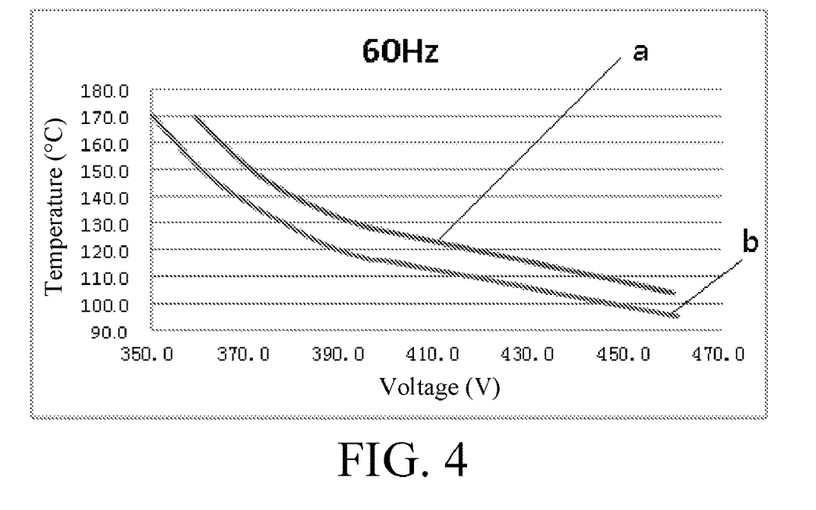
FIG. 4 is a graph showing a voltage-temperature relation in a compressor with a conventional motor under an operation condition of 60 Hz and a voltage-temperature relation in a compressor with a motor including the stator iron core of FIG. 2 under the operation condition of 60 Hz.

Referring to FIG. 3 and FIG. 4, FIG. 3 and FIG. 4 are respective voltage-temperature graphs of a compressor using a conventional motor and a compressor using a motor having the stator iron core with the above-mentioned cut-edges under operation conditions of 50 Hz and 60 Hz.

In FIG. 3 and FIG. 4, a curve a represents the compressor using the conventional motor, and a curve b represents the compressor using the motor whose stator has the asymmetrical cut edges as described in the present invention, particularly, the asymmetrical cut edges as shown in FIG. 2A-FIG. 2D.

It would be apparent to those skilled in the art that, the curves a and b in FIG. 3 and FIG. 4 gradually go down as the voltage decreases, and the curve b is always below the curve a. In other words, it is obvious that, compared with the conventional motor, the stator iron core with the asymmetrical cut edges can effectively improve the cooling effect of the motor, and that the temperature of the motor can be effectively controlled. The compressor including the motor whose stator has the above-mentioned asymmetrical cut edges has a better cooling and heat dissipation effect than the compressor including the conventional motor, and is always controlled to maintain a lower temperature.

Similarly, in other embodiments, various modifications and variations may be made on the basis of the above-mentioned embodiments.

In practical applications, during manufacturing of the stator, multiple cut edges may be disposed on the outer periphery of the yoke of the stator iron core. In addition, the cut edges are in pairs but not all of the cut edges are symmetrically disposed. For example, an even number of cut edges are disposed in pairs and opposite to each other on two sides of diameters passing through the center of the stator iron core, not all the pairs of cut edges are symmetrically arranged. In a more specific example, among the pairs of cut edges that are asymmetrically arranged, respective distances from respective center points of cut edges in at least one pair of cut edges to the center of the stator iron core are different; or, the cut edges in at least one pair of cut edges are disposed opposite to each other on the two sides of the center of the stator iron core, but are not in parallel, that is, form an angle therebetween.

Alternatively, there are an odd number of asymmetrically arranged cut edges, and angles between neighboring cut edges in the odd number of cut edges are unevenly distributed in a circumferential direction. Apparently, these cut edges are asymmetrically arranged.

Based on the above, the above-mentioned embodiments have the same general technical concept, that is, the cut edges on the outer periphery of the yoke of the stator iron core are asymmetrically arranged. More specifically, not all respective distances from respective center points of neighboring cut edges to the center of the stator iron core are the same. Therefore, as required, any number of asymmetrically arranged cut edges may be disposed on the outer periphery of the yoke of the stator iron core.

Alternatively, it should also be noted that the present invention is not limited to the above-mentioned embodiments, and changes which are feasible within the overall dimension of the yoke of the stator iron core, such as changes in the distance between the cut edges and the lengths of the arc segments between the cut edges, shall also be encompassed by the protection scope of the present invention.

In practical applications, various modifications may be made to shapes of the stator teeth and the stator slots. For example, the remote end of the stator teeth that extend inward may be a projecting portion in the shape of a square, a semicircle, or the like. Alternatively, the stator slots may be in a rectangular shape, in a shape such as a down trapezoid that has a gradually increasing width as it extends outward along the radial direction, in a semicircular shape, or the like. The objectives of the present invention can also be achieved with such changes.

Alternatively, in practical applications, the number of stator teeth and the number of stator slots may both be set to four, eight, twelve, or other values according to requirements of practical use.

As known to those skilled in the art, the number and the shape of the stator teeth and the stator slots as well as the lengths and arrangement of the arc segments between the cut edges may be configured freely as long as functions and advantages of the asymmetrically-arranged cut edges of the present invention can be achieved.

In addition, as known to those skilled in the art, a compressor generally needs be driven by a motor. The interior permanent magnet motor of the present invention can be applied to any compressor known in the prior art or any future compressor. Generally, the operating voltage of the compressor is a medium or low voltage that is lower than or equal to 600 V.

The above-mentioned obvious advantages that can be achieved with the stator iron core and the motor including the stator iron core of the present invention are described below with reference to specific embodiments, that is, principles for improving the cooling performance and lowering the temperature during operation will be described below.

As shown in FIG. 1, in the scroll compressor, the motor, particularly the three-phase induction motor, is placed horizontally along its rotation axis, and thus the cross-section of the stator is placed vertically, and oil in an oil path flows along an outer periphery of the motor and is sucked through a suction port from the side of the motor. When a gas flow has an obvious lifting force, it will affect the flow of the oil downward to the suction port, leading to unsmooth circulation in the oil path. In addition, in a stator iron core without cut edge or with symmetrical cut edges, the gap between the outer periphery of the yoke and the shell of the motor is small and the cooling and heat dissipation effect of the gas flow is affected; or, since the gas flow is evenly distributed within the motor, the circulation in the oil path is affected, and even worse, accumulation of excessive heat may be brought to the motor.

In view of the above, asymmetrically-arranged cut edges may be arranged on the outer periphery of the yoke of the stator iron core. In this solution, a gas flow passes through the gap between the cut edges and the shell of the motor, and thereby the cooling effect is enhanced. The arrangement of the asymmetrical cut edges changes the even distribution of the gas flow between the outer periphery of the stator iron core and the shell, thereby avoiding an even lifting gas flow and interrupting the lifting gas flow from preventing the oil from the falling down. As a result, the circulation in the oil path is smoother and the heat accumulation on the motor is reduced. Therefore, the cooling and heat dissipation performance of the motor is directly or indirectly improved, while ensuring the stable operation of the motor and the compressor including the motor, and substantially maintaining the efficiency at the same level as that of the conventional motor and compressor.

In the present invention, the gas path and the oil path in the compressor can be flexibly adjusted because the asymmetrical cut edges are disposed on the yoke of the stator iron core. Therefore, the cooling effect and the oil path can be improved, the cooling performance of the motor can be enhanced, the oil circulation rate (OCR) can be reduced, and while the performance, particularly the efficiency, of the motor can be substantially maintained. In addition, while ensuring the utilization rate of the stator iron core and satisfying the cooling and heat dissipation requirements of the motor, the asymmetrical cut edges remove the defect of insufficient cross-sectional area for the cooling path in a circular stator iron core, save materials and improve the cost performance ratio to the most extent. Therefore, the asymmetrical cut edges are a good design for cooling and heat dissipation. In addition, as the cut edges are disposed on the stator iron core of the motor, particularly on the outer surface of the yoke, a smoother oil path can be achieved, thereby the energy efficiency of the compressor can be improved. In the present invention, as shown in the above examples, although the depth of the cut edges along a radial direction of the stator iron core is limited, the asymmetrical arrangement can still ensure the cooling and heat dissipation effect. In this way, the cut edges with a limited cutting depth in the stator iron core can ensure the firmness of the stator mounted into the shell and also can increase the cross-sectional area for bearing the deformation on the stator, thereby greatly reducing the possibility of severe deformation of the stator.

Each of the above embodiment focuses on differences from other embodiments. Same or similar parts in an embodiment can refer to other embodiments.

The foregoing specification, examples, and data provide a detailed description of the stator, the motor, and the compressor. Although preferred embodiments of the present invention are set forth herein, the foregoing embodiments are merely described for the purpose of facilitating the understanding of the present invention and the core idea thereof, and are not intended to limit the scope of the present invention. In addition, although some embodiments of the overall inventive concept have been shown and illustrated, it would be appreciated by those of ordinary skill in the art that various specific modifications, equivalent replacements, and improvements may be made to the technical solutions of the present invention in terms of embodiments and the application scope without departing from the spirit and scope of the design of the present invention, and such modifications, equivalent replacements, and improvements shall all fall within the protection scope as defined by the appended claims of the present invention and their equivalents. Furthermore, the technical features recorded in the embodiments of the present invention can be combined to form a new technical solution, and the new technical solution obtained shall also fall within the scope of the claims of the present invention.

What is claimed is:

1. A stator applicable to a single-phase or polyphase motor, comprising:
   a stator iron core, wherein the stator iron core comprises:
      an annular yoke,
      multiple stator teeth, near ends of the multiple stator teeth being fixedly adjacent to an inner surface of the annular yoke and projecting inward towards a center of the stator iron core along a radial direction of the annular yoke, remote ends of the stator teeth the multiple stator teeth that face inward along the radial direction defining a center hole for accommodating a rotor, and the multiple stator teeth being spaced from each other in a circumferential direction, and
      multiple stator slots, each of the multiple stator slots being defined between two neighboring stator teeth; and
   a winding, wound on the multiple stator teeth and operable for generating a rotating magnetic field;
   wherein the annular yoke of the stator iron core has at least two cut edges at an outer periphery of the stator iron core; wherein a number of the at least two cut edges is an even number; among the even number, every two opposite cut edges are arranged as a pair in parallel on two sides of the center of the stator iron core, and the center of the stator iron core is located in middle of a connecting line between respective center points of the two opposite cut edges in each pair of the two opposite cut edges; and
   wherein, on a connecting line between respective center points of at least one pair of the pairs of the two opposite cut edges, respective distances from the center of the stator iron core to the respective center points of the cut edges in said at least one pair are different.

2. The stator according to claim 1, wherein, on the connecting line between the respective center points of the two opposite cut edges in said each pair of the two opposite cut edges, respective distances from the center of the stator iron core to the respective center points of the two opposite cut edges in said each pair of the two opposite cut edges are different.

3. The motor, comprising a rotor and a stator, wherein the rotor is rotatably disposed in the stator and is spaced apart from the stator by a distance, and the stator is the stator according to claim 2.

4. The stator according to claim 1, wherein arc segments between neighboring cut edges are located on the same circle on an outer periphery of the annular yoke, and a center of the circle coincides with the center of the stator iron core.

5. The motor, comprising a rotor and a stator, wherein the rotor is rotatably disposed in the stator and is spaced apart from the stator by a distance, and the stator is the stator according to claim 4.

6. The stator according to claim 4, wherein the arc segments between the neighboring cut edges are not evenly distributed in the circumferential direction.

7. The motor, comprising a rotor and a stator, wherein the rotor is rotatably disposed in the stator and is spaced apart from the stator by a distance, and the stator is the stator according to claim 6.

8. The stator according to claim 1, wherein the stator iron core is made of a laminated and stamped silicon steel sheet material.

9. The motor, comprising a rotor and a stator, wherein the rotor is rotatably disposed in the stator and is spaced apart from the stator by a distance, and the stator is the stator according to claim 8.

10. The stator according to claim 8, wherein the stator iron core is an integral unit manufactured by any process selected from the following:
   directly stamping a silicon steel sheet on which the at least two cut edges, the multiple stator teeth, and the multiple stator slots have been machined; and
   stamping a silicon steel sheet and performing edge-cutting on an outer periphery of the stamped silicon steel sheet.

11. The motor, comprising a rotor and a stator, wherein the rotor is rotatably disposed in the stator and is spaced apart from the stator by a distance, and the stator is the stator according to claim 10.

12. A motor, comprising a rotor and a stator, wherein the rotor is rotatably disposed in the stator and is spaced apart from the stator by a distance, and the stator is the stator according to claim 1.

13. The motor according to claim 12, wherein an operating voltage of the motor is 200V to 575V or an operating voltage of a driver for the motor is 200V to 575V.

14. The motor according to claim 12, wherein the motor is a fixed-frequency motor or a variable-frequency motor.

15. The motor according to claim 14, wherein the motor is a three-phase induction motor.

16. A compressor, comprising the stator according to claim 1 or a motor, comprising a rotor and a stator, wherein the rotor is rotatably disposed in the stator and is spaced apart from the stator by a distance.

17. The compressor according to claim 16, wherein the compressor is a scroll compressor.

18. The compressor according to claim 16, wherein a suction port for gas suction in the compressor is configured to be close to a cut edge whose center point is closer to a center of a stator iron core than other cut edge belonging to the same pair of the two opposite cut edges.

19. A stator for a single-phase or polyphase motor, comprising:
   a stator iron core, wherein the stator iron core comprises:
      an annular yoke,
      multiple stator teeth, near ends of the multiple stator teeth being fixedly adjacent to an inner surface of the annular yoke and projecting inward towards a center of the stator iron core along a radial direction of the annular yoke, remote ends of the multiple stator teeth that face inward along the radial direction defining a center hole for accommodating a rotor, and the multiple stator teeth being spaced from each other in a circumferential direction, and
      multiple stator slots, each of the multiple stator slots being defined between two neighboring stator teeth; and
   a winding, wound on the multiple stator teeth and operable for generating a rotating magnetic field;
   wherein the annular yoke of the stator iron core has at least two cut edges at an outer periphery of the stator iron core, and distances from center points of neighboring cut edges to a center of the stator iron core are not all the same;
   wherein a number of the at least two cut edges is an even number; among the even number, every two opposite cut edges are arranged as a pair on two sides of the center of the stator iron core; and wherein two opposite cut edges in at least one pair of the pairs of the two opposite cut edges are arranged to form an angle between the two opposite cut edges.

20. A stator for a single-phase or polyphase motor, the stator comprising:
   a stator iron core, wherein the stator iron core comprises:
      an annular yoke,
      multiple stator teeth, near ends of the multiple stator teeth being fixedly adjacent to an inner surface of the annular yoke and projecting inward towards a center of the stator iron core along a radial direction of the annular yoke, remote ends of the stator teeth the multiple stator teeth that face inward along the radial direction defining a center hole for accommodating a rotor, and the multiple stator teeth being spaced from each other in a circumferential direction, and
      multiple stator slots, each of the multiple stator slots being defined between two neighboring stator teeth; and
   a winding, wound on the multiple stator teeth and operable for generating a rotating magnetic field;
   wherein the annular yoke of the stator iron core has at least two cut edges at an outer periphery of the stator iron core, and distances from center points of neighboring cut edges to a center of the stator iron core are not all the same; and
   wherein a number of the at least two cut edges is an odd number, and angles between neighboring cut edges among the odd number of cut edges are not the same in the circumferential direction.

* * * * *

UNITED STATES PATENT AND TRADEMARK OFFICE
CERTIFICATE OF CORRECTION

PATENT NO. : 10,389,216 B2
APPLICATION NO. : 15/392350
DATED : August 20, 2019
INVENTOR(S) : Weiping Tang et al.

Page 1 of 1

It is certified that error appears in the above-identified patent and that said Letters Patent is hereby corrected as shown below:

In the Claims

Column 12, Claim 1, Line 17, after "ends of" delete "the stator teeth".

Column 14, Claim 20, Line 31, after "ends of" delete "the stator teeth".

Signed and Sealed this
Third Day of December, 2019

Andrei Iancu
*Director of the United States Patent and Trademark Office*